April 22, 1941.  Y. HAYASHI  2,239,422
CURB SIGNAL FOR AUTOMOBILES
Filed April 19, 1940
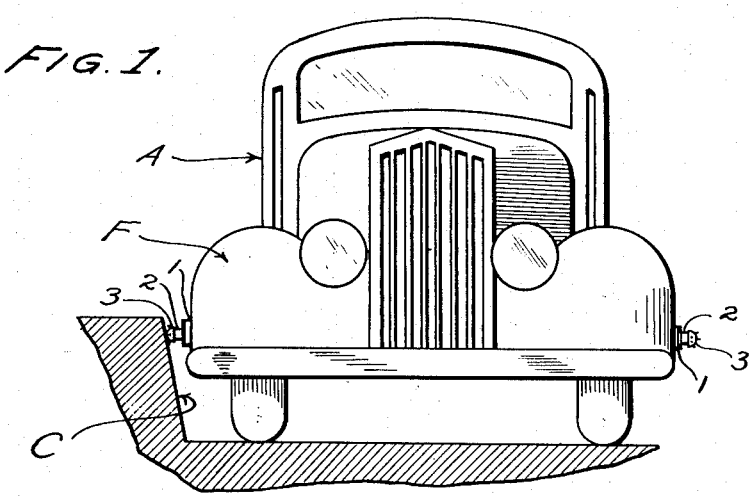
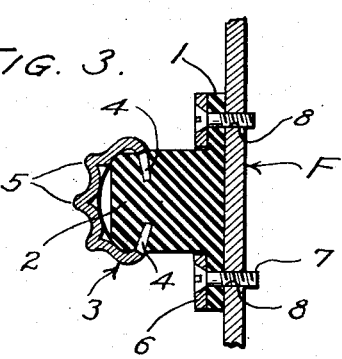
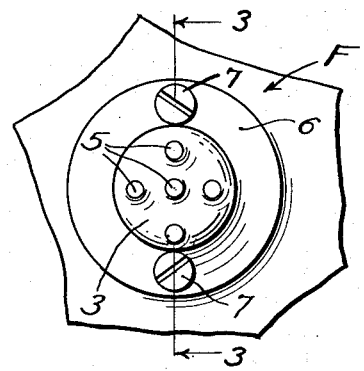
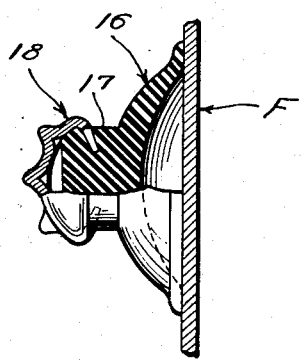
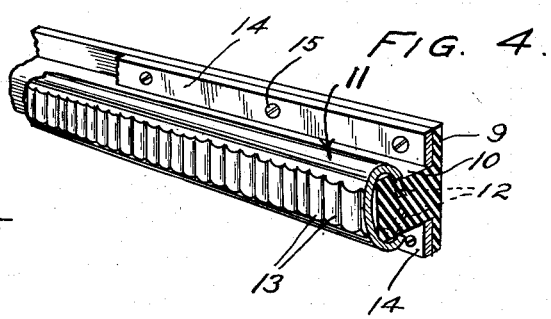
INVENTOR.
YOSHIO HAYASHI
BY Edward M. Kajima
ATTORNEY.

Patented Apr. 22, 1941

2,239,422

UNITED STATES PATENT OFFICE 2,239,422

CURB SIGNAL FOR AUTOMOBILES

Yoshio Hayashi, Los Angeles, Calif.

Application April 19, 1940, Serial No. 330,511

6 Claims. (Cl. 116—28)

This invention has for a purpose the provision of novel signal device of simple and inexpensive construction, and adapted to be affixed to an automobile for indicating by means of a distinctive scraping sound the proximity of a curb stone, wall or the like, to the automobile, whereby the driver may park or manipulate the automobile without contacting or scraping and thereby marring or damaging the fenders, running board or other parts of the automobile.

Another purpose of my invention is to provide a signal of the character described which may be readily attached to the fenders, hub caps, running boards or other parts of the automobile so as to extend outwardly for contact with curbing, walls or the like, in advance of that part of the automobile to which it is attached, and thereby produce a distinctive sound as a warning to the driver; the signal being small, inconspicuous and so positioned as to accomplish its purpose without constituting a dangerous projection or detracting from the appearance of the automobile.

Another purpose of my invention is to provide a signal wherein a rubber projection is affixed as herebefore stated to the automobile and provided on its outer end with a metal member constructed to produce a distinctive noise when scraped against curbing, a wall or the like during the manipulation of the automobile adjacent said, wall or curbing. The rubber member renders the device flexible and make for a novel and effective fastening of the device to the automobile without damaging or marring the part to which it is attached. Moreover the rubber member is not only freely, universally flexible, but readily compressible in all directions and therefore the device will not be readily damaged nor likely to mar or injure objects it may come in contact with.

The invention is characterized by other advantages and features some of which, with the foregoing will be set forth at length in the following description where I shall outline in full that form of my invention which is selected for illustration in the accompanying drawing. It is to be understood that I do not limit myself to the form shown in said drawing and described herewith, inasmuch as the invention as defined in the claims hereto appended may be embodied in various forms.

Referring to the drawing,

Fig. 1 is a front elevation of an automobile equipped with a curb signal embodying my invention and showing one manner of use thereof as for indicating the proximity of the automobile to street curbing, Fig. 2 is a top plan view of the signal of my invention, Fig. 3 is a sectional view taken on the plane of line 3—3 of Fig. 2, with the part of the automobile to which the device is attached, shown in section, Fig. 4 is a perspective view of a variational form of my invention, Fig. 5 is a fragmentary side elevation of another variation of my invention in which the rubber projection is a part of a vacuum cup.

One form of curb signal embodying my invention is shown in detail in Figs. 1, 2, and 3 and comprises a soft rubber circular base member 1 having an integral, cylindrical stud like rubber projection 2 centrally thereof.

On the outer end of this rubber projection a metal tip or cap 3 is affixed, said tip having tongues 4 extending into the projection for securing it thereon. Preferably the tip is concavo-convex and provided on its convex side with small projections, corrugation, knobs or tongues 5 forming a roughened surface for making a distinctive scraping sound.

The signal of my invention is adapted to be affixed to the fenders running boards, or any suitable part of an automobile so that it will extend outwardly for contact with street curbing or a wall, etc. in advance of automobile part to which it is attached, and thereby produce a scraping sound as a warning signal.

As shown in Fig. 1, a typical installation consists in affixing the signal to a fender F of an automobile A, in position to contact the street curbing C in advance of the fender or any side portion of the automobile. The device is affixed by means of a metal ring 6 surrounding the projection 2 and lying on the base member 1, and self threading or ordinary screws 7. These screws are inserted through apertures in the ring and base and threaded or suitable openings 8 formed in the fender or part of the automobile to which the device is secured.

As will be apparent with reference to Fig. 1, the metal cap or tip 3 will produce a scraping sound when encountering the curbing wall or the like along which the automobile is driven. The rubber base 1 and projection 2 will permit the device to yield or flex in all directions and will also be subject to compression, wherefore the device is not likely to become damaged or to mar or injure the automobile to which it is attached or any object with which it contacts.

The rubber also causes the metal tip to produce a distinctive sound, entirely different from that produced by contact of the other parts of the automobile with an obstruction or curbing.

Instead of a generally circular device as shown in Figs. 1, 2 and 3 I may make an elongated signal device as shown in Fig. 4. This variational form comprises an elongated strip-like soft rubber base 9 having an outstanding soft rubber rib or projection 10 formed integral therewith and extending longitudinally thereof. A metal channel member 11 is mounted on the outer edge of the rib and has inwardly extending tongues 12 for securing it in place. This member 11 has a roughened outer surface provided by means of corrugations 13. Metal strips 14 are laid on the base and screws 15 are inserted through these strips and the rubber base for securing the device to the automobile. The metal member 11 will extend longitudinal of the automobile and contact the curbing so as to make a scraping marking signal to indicate the proximity of the automobile to the curb. This form has all of the qualities and advantages of the first described form of my invention, and in being elongated offers a greater protective and signalling surface.

Another form of my invention as shown in Fig. 5 comprises a rubber vacuum cup base 16 having a central soft rubber projection 17 on its convex side. A metal cap 18 the same as the cap in the first described form is affixed to the outer end of the projection 17 for contacting curbing as in the forms of my invention hereinbefore described. The rubber vacuum cup affords a quick and easy attachment of the device to a fender or other part of the automobile.

I claim:

1. A curb signal device for automobiles, comprising, a base adapted to be secured to a fender or other portion of an automobile, a soft rubber projection carried by said base so as to extend outwardly from the fender or part of the automobile to which the base is secured, and a metal cap fixed on and covering the outer end of said projection for engaging a curb, wall or the like in advance of the part to which the base is secured, whereby to produce a scraping sound as a warning signal when parking or driving the automobile adjacent said curb, wall or the like.

2. A curb signal device for automobiles, comprising, an elongated base adapted to be secured to a fender or other portion of an automobile, an elongated soft rubber projection carried by said base so as to extend outwardly in the form of a ridge from the fender or part of the automobile to which the base is secured, and an elongated metal cap covering the outer edge of said projection for engaging a curb, wall or the like in advance of the part to which the base is secured, whereby to produce a scraping sound as a warning signal when parking or driving the automobile adjacent said curb, wall or the like.

3. A curb signal for an automobile comprising a soft rubber base adapted to be engaged with and secured to a fender or other part of an automobile, a soft rubber projection formed integral with and extending outwardly from said base, a metal cap on the outer end of said projection for engaging in advance of the automobile part to which the signal is attached, the curbing or object adjacent to which the automobile is driven, whereby due to such engagement of said cap there will be produced a scraping noise as a warning signal to the driver.

4. A curb signal for an automobile comprising a soft rubber base adapted to be engaged with and secured to a fender or other part of an automobile, a soft rubber projection formed integral with and extending outwardly from said base, a metal cap on the outer end of said projection for engaging in advance of the automobile part to which the signal is attached, the curbing or object adjacent to which the automobile is driven, whereby due to such engagement of said cap there will be produced a scraping noise as a warning signal to the driver, said base being concavo-convex and forming a suction cup affording the affixation thereof to the automobile.

5. A curb signal for an automobile comprising a soft rubber base adapted to be engaged with and secured to a fender or other part of an automobile, a soft rubber projection formed integral with and extending outwardly from said base, a metal cap on the outer end of said projection for engaging in advance of the automobile part to which the signal is attached, the curbing or object adjacent to which the automobile is driven, whereby due to such engagement of said cap there will be produced a scraping noise as a warning signal to the driver, and a metal ring surrounding said projection and lying upon said base, said ring and base having openings therein for fastening for securing the base to the automobile.

6. A curb signal for an automobile comprising a soft rubber base adapted to be engaged with and secured to a fender or other part of an automobile, a soft rubber projection formed integral with and extending outwardly from said base, a metal cap on the outer end of said projection for engaging in advance of the automobile part to which the signal is attached, the curbing or object adjacent to which the automobile is driven, whereby due to such engagement of said cap there will be produced a scraping noise as a warning signal to the driver, said cap having inturned portions extending into the projection for holding the cap thereon.

YOSHIO HAYASHI.